US008935781B1

(12) United States Patent
Muth

(10) Patent No.: US 8,935,781 B1
(45) Date of Patent: Jan. 13, 2015

(54) NATIVE CODE MODULE SECURITY FOR ARM 64-BIT INSTRUCTION SET ARCHITECTURES

(71) Applicant: Google Inc., Mountain View, CA (US)

(72) Inventor: Robert Muth, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/757,660

(22) Filed: Feb. 1, 2013

(51) Int. Cl.
*G06F 11/00* (2006.01)
*G06F 17/30* (2006.01)
*G06F 21/51* (2013.01)
*G06F 21/53* (2013.01)

(52) U.S. Cl.
CPC ............... *G06F 21/51* (2013.01); *G06F 21/53* (2013.01)
USPC .................................. 726/22; 726/26; 726/27

(58) Field of Classification Search
CPC ....... G06F 21/78; G06F 21/79; G06F 21/121; G06F 21/44; G06F 21/50; G06F 21/51; G06F 21/554; G06F 9/3867; G06F 9/30185; G06F 9/3007; G06F 3/062; G06F 3/0622
USPC ............ 726/22–24, 26–27, 30; 713/187, 190; 711/100–104; 712/1, 56, 200, 712/208–212, 248
See application file for complete search history.

(56) References Cited

U.S. PATENT DOCUMENTS

| | | | |
|---|---|---|---|
| 5,802,275 A | 9/1998 | Blonder | |
| 6,499,099 B1 * | 12/2002 | Cho | 712/210 |
| 7,284,241 B2 * | 10/2007 | Heishi et al. | 717/152 |
| 7,380,275 B2 | 5/2008 | Srinivasan et al. | |
| 7,401,230 B2 | 7/2008 | Campbell et al. | |
| 7,690,023 B2 | 3/2010 | Kato et al. | |
| 8,195,923 B2 * | 6/2012 | Spracklen et al. | 712/209 |
| 8,549,275 B2 | 10/2013 | Mittal | |
| 8,601,285 B2 | 12/2013 | Ekberg et al. | |
| 8,621,444 B2 | 12/2013 | Dutt et al. | |

FOREIGN PATENT DOCUMENTS

WO 2008/054456 5/2008

OTHER PUBLICATIONS

'Chrome' [online]. "ARM 32-bit Sandbox," retrieved on Mar. 13, 2014. Retrieved from the internet: URL <http://developer.chrome.com/native-client/reference/sandbox_internals/arm-32-bit-sandbox>, 27 pages.
Architecture Group, "ARMv8 Instruction Set Overview,"ARM Limited reference manual, Nov. 11, 2011, 1-112.

* cited by examiner

*Primary Examiner* — Hosuk Song
(74) *Attorney, Agent, or Firm* — Fish & Richardson P.C.

(57) ABSTRACT

Methods, systems, and apparatuses, including computer programs, for safely executing a native code module for an ARM 64-bit instruction set. The native code module contains native code that is executed within a secure runtime environment that isolates the native code module from sensitive data and resources on the computing system. The native code module is validated by a validator prior to execution within the secure runtime environment to ensure that the native code module complies with a set of security constraints.

40 Claims, 5 Drawing Sheets

NATIVE CODE MODULE SECURITY FOR ARM 64-BIT INSTRUCTION SET ARCHITECTURES

BACKGROUND

1. Technical Field

The present embodiments relate to techniques for safely executing native code modules. More specifically, the present embodiments relate to methods and systems for safely executing native code modules within ARM 64-bit instruction set architectures. (ARM is a registered trademark of ARM Limited of Cambridge, England.)

2. Related Art

Easy access to computers and plentiful network bandwidth have facilitated sharing of information and applications. For instance, a user of a computing device, e.g., a personal computer, a mobile phone, or a personal digital assistant, may easily install and execute an application downloaded from a web site or received from a friend as an email attachment. Similarly, a user of shared cloud computers may upload and run an application that is unknown to the operator of the cloud. This entails risk to the operator and, if the application has access to resources shared with other users, to the other users. Installing and executing such applications on a given computing device typically involves a level of trust that is granted on an all-or-nothing basis by the operating system of the computing device. Furthermore, bugs in the operating system may inadvertently allow applications to access resources As a result, some applications, e.g., native applications, may have full access to the operating system and/or resources of the computing device, while other applications, e.g., web applications, may have little to no direct access to the operating system and/or resources of the computing device.

Such coarse application of trust may negatively impact the execution of all applications on the computing device. For example, native applications may produce unwanted side effects by modifying files on the computing device and/or engaging in computation or communication outside of the tasks or features requested by the user. On the other hand, web applications may execute one to two orders of magnitude slower than native applications and may provide limited functionality to the user.

SUMMARY

This specification describes methods, systems, and apparatuses, including computer programs, for safely executing a native code module for an ARM 64-bit instruction set. The native code module contains native code. The system executes the native code within a secure runtime environment that isolates the native code module from sensitive data and resources on the computing system. The native code module is additionally validated by a validator prior to execution within the secure runtime environment to ensure that the native code module complies with a set of security constraints.

In general, one innovative aspect of the subject matter described in this specification can be embodied in methods that include the actions of receiving a native code module for an ARM 64-bit instruction set, wherein the instruction set has several types of store instructions, wherein one or more of the types of store instructions are forbidden instructions, and wherein the native code has one or more store instructions; loading the native code module into a secure runtime environment, wherein an address space of the secure runtime environment is divided into multiple regions, and wherein one of the regions is a write area; validating the native code module; verifying that no reachable store instruction in the native code module is a forbidden instruction; verifying that, for each reachable store instruction in the native code module that uses a 64-bit base register, the 64-bit base register used by the instruction is masked by one or more diffuser instructions; defining a first write area buffer zone above and adjacent to the write area; defining a second write area buffer zone below and adjacent to the write area; determining that a first reachable store instruction in the native code module has an extended register offset, wherein a destination address of the first reachable store instruction is determined as a sum of an address contained in a first base register and a scaled 32-bit offset value contained in a first 64-bit offset register; and determining that each write area buffer zone is at least 16 gigabytes in size. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

The foregoing and other embodiments can each optionally include one or more of the following features, alone or in combination. The native code module includes one or more branch instructions. One of the regions is a code area. The code area is partitioned into equally sized code bundles. Validating the native code module includes verifying that, for each indirect branch instruction having a respective destination address pointing into the code area, the respective destination address of the branch instruction is a start of one of the code bundles. Validating the native code module includes verifying that, for each direct branch instruction having a respective destination address pointing into the code area, executing the branch instruction does not allow an unsafe instruction to be executed without its corresponding diffuser instruction or instructions being executed. Validating the native code module includes verifying that, for each reachable store instruction in the native code module that uses a 64-bit base register, the one or more diffuser instructions occur before the store instruction in the same code bundle as the store instruction. Validating the native code module includes verifying that no instruction that could modify the base register of the store instruction occurs after any of the one or more diffuser instructions and before the store instruction. The one or more diffuser instructions include at least a first instruction that clears one or more most significant bits of the base register of the store instruction, such that a destination address of the store instruction must lie within the write area or one of the write area buffer zones. The methods include the action of verifying that each memory page of the write area buffer zones is marked as non-writable or is unmapped.

In general, another innovative aspect of the subject matter described in this specification can be embodied in methods that include the actions of receiving a native code module for an ARM 64-bit instruction set, wherein the instruction set has several types of load instructions, wherein one or more of the types of load instructions are forbidden instructions, and wherein the native code has one or more load instructions;

loading the native code module into a secure runtime environment, wherein an address space of the secure runtime environment is divided into multiple regions, and wherein one of the regions is a read area; validating the native code module; verifying that no reachable load instruction in the native code module is a forbidden instruction; verifying that, for each reachable load instruction in the native code module that uses a 64-bit base register, the 64-bit base register used by the instruction is masked by one or more diffuser instructions; defining a first read area buffer zone above and adjacent to the read area; defining a second read area buffer zone below and adjacent to the read area; determining that a first reachable load instruction in the native code module has an extended register offset, wherein a source address of the first reachable load instruction is determined as a sum of an address contained in a first base register and a scaled 32-bit offset value contained in a first 64-bit offset register; and determining that each read area buffer zone is at least 16 gigabytes in size. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The native code module includes one or more branch instructions. One of the regions is a code area. The code area is partitioned into equally sized code bundles. Validating the native code module includes verifying that, for each indirect branch instruction having a respective destination address pointing into the code area, the respective destination address of the branch instruction is a start of one of the code bundles. Validating the native code module includes verifying that, for each direct branch instruction having a respective destination address pointing into the code area, the respective destination address of the branch instruction does not jump to a location between an unsafe instruction and its associated one or more diffuser instructions. Validating the native code module includes verifying that, for each reachable load instruction in the native code module that uses a 64-bit base register, the one or more diffuser instructions occur before the store instruction in the same code bundle as the load instruction. Validating the native code module includes verifying that no instruction that could modify the base register of the load instruction occurs after any of the one or more diffuser instructions and before the load instruction. The one or more diffuser instructions include at least a first instruction that clears one or more most significant bits of the base register of the load instruction, such that a source address of the load instruction must lie within the read area or one of the read area buffer zones. The methods include the action of verifying that each memory page of the read area buffer zones is marked as non-readable or is unmapped.

In general, another innovative aspect of the subject matter described in this specification can be embodied in methods that include the actions of receiving a native code module for an ARM 64-bit instruction set, wherein the instruction set comprises one or more types of forbidden instructions; loading the native code module into a secure runtime environment, wherein an address space of the secure runtime environment is divided into at least a code area and a non-overlapping trusted area; validating the native code module; verifying that the code area includes no forbidden instructions; and verifying that instructions can be executed only from the code area or the trusted area. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Verifying that instructions can be executed only from the code area or the trusted area includes verifying that all of the address space other than the code area and the trusted area is marked as non-executable or is unmapped. Verifying that instructions can be executed only from the code area or the trusted area includes verifying that branch instructions can only branch to the code area or the trusted area. Verifying that instructions can be executed only from the code area or the trusted area includes partitioning the code area into equally sized code bundles, wherein each code bundle has a start address. Verifying that instructions can be executed only from the code area or the trusted area includes verifying that branch instructions that branch into the code area must branch to the start address of one of the equally sized code bundles. Verifying that instructions can be executed only from the code area or the trusted area includes verifying that each branch instruction that branches into the trusted area must branch to a respective safe entry point.

In general, another innovative aspect of the subject matter described in this specification can be embodied in methods that include the actions of receiving a native code module for an ARM 64-bit instruction set, wherein the native code module has one or more indirect branch instructions, each indirect branch instruction having a respective destination address contained in a respective 64-bit destination register; loading the native code module into a secure runtime environment, wherein an address space of the secure runtime environment is divided into multiple regions, and wherein one of the regions is a code area; partitioning the code area into equally sized code bundles, each code bundle having a respective start address, wherein each start address is a multiple of a predetermined power of two; validating the native code module; and verifying that, for each indirect branch instruction in the native code module, one or more corresponding diffuser instructions exist, wherein the combined effect of the one or more diffuser instructions is to clear one or more of the most significant bits of the destination register such that the destination address must lie within the code area, and to clear one or more least significant bits of the destination register such that the destination address must be a multiple of the predetermined power of two. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Validating the native code module includes, for each indirect branch instruction in the native code module, verifying that the one or more corresponding diffuser instructions occur before and in the same bundle as the indirect branch instruction. Validating the native code module includes, for each indirect branch instruction in the native code module, verifying that no instruction that could modify the destination register occurs between the one or more corresponding diffuser instructions and the indirect branch instruction. The one or more corresponding diffuser instructions include a first diffuser instruction that clears one or more most significant bits of the destination register, such that the destination address must lie within the code area, and a second diffuser instruction that clears one or more least significant bits of the destination register such that the destination address must be a multiple of the predetermined power of two. Alternatively, the one or more corresponding diffuser instructions are a single diffuser instruction that clears one or more most significant bits of the destination register, such that the destination address must lie within the code area, and that clears one or more least significant bits of the destination register, such that the destination address must be a multiple of the predetermined power of two.

Particular embodiments of the subject matter described in this specification can be implemented so as to realize one or more of the following advantages. Embodiments may provide per-thread protection with low performance overhead during execution of native code modules for ARM 64-bit instruction sets while maintaining platform independence and portability across different web browsers and operating systems. Embodiments may provide per-thread protection that constrains threads used to execute untrusted code in the native code module while allowing trusted code used to validate and execute the native code module to execute without constraints. Embodiments may permit a wider variety of store and load instructions in the native code module by requiring large write area buffer zones and read area buffer zones. Embodiments may simplify verification by enforcing that the code and the data in the native code module are in separate areas. Furthermore, embodiments may improve performance by minimizing overhead associated with masking store and load instructions.

Finally, the direct execution of the native code module on ARM 64-bit hardware may allow the native code module to execute on a variety of ARM 64-bit processors and operating systems without modification.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments.

This specification describes methods and systems for maintaining security for the native code module within an ARM 64-bit instruction set architecture (ISA), e.g., the architectures referred to as ARMv8 that include the A64 instruction set. To maintain security, the validator and the secure runtime environment maintain control flow integrity and constrain store and load instructions in the native code module. Consequently, this specification describes methods and systems that provide per-thread protection with low performance overhead during execution of native code modules while maintaining platform independence and portability across different web browsers and operating systems.

Figure 1:
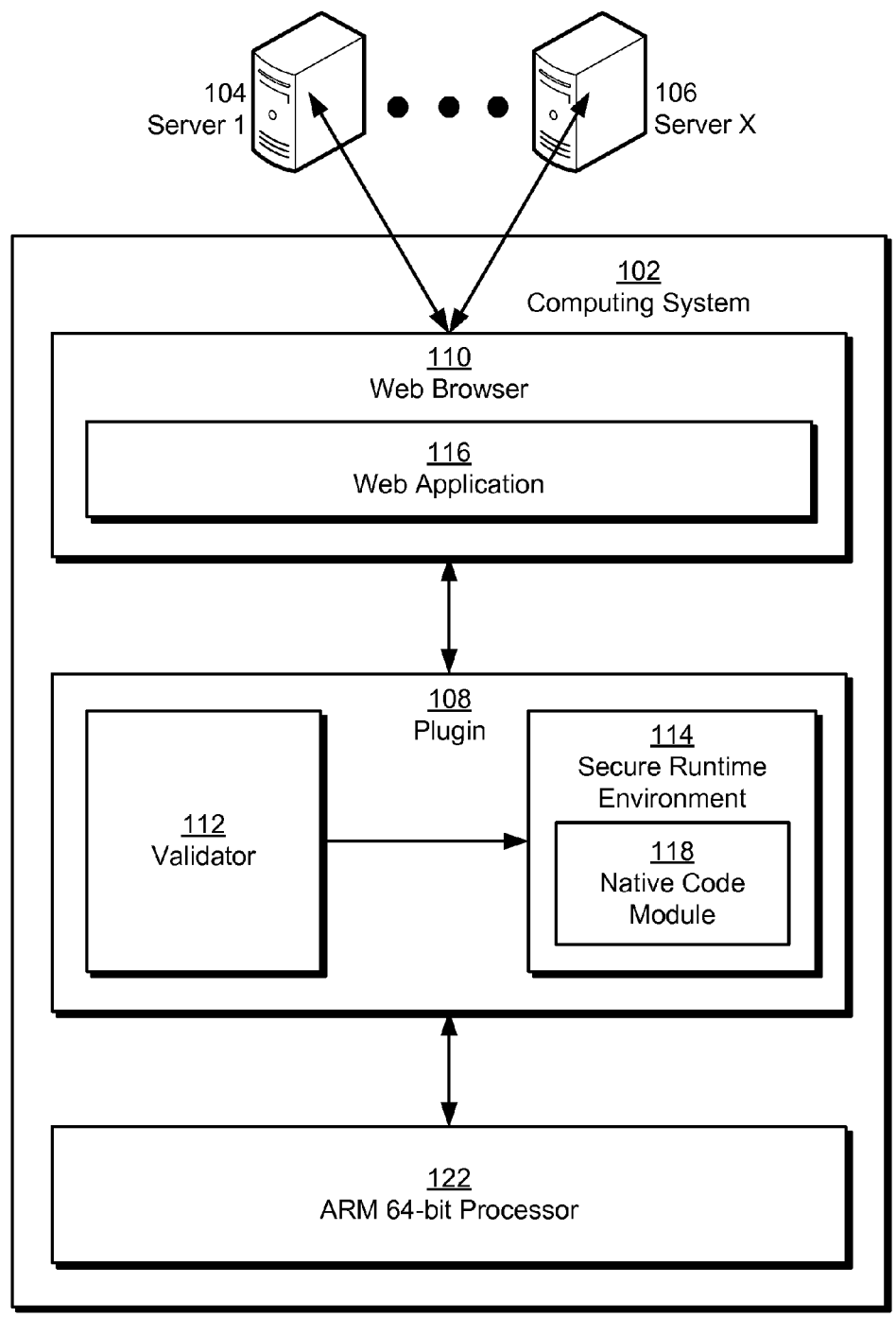
FIG. 1 is a schematic of a system that includes an ARM 64-bit processor and a secure runtime environment.

FIG. 1 is a schematic of an example system. This example system includes a computing system 102 and a set of servers, e.g., server 1 104 and server x 106. Computing system 102 includes a web application 116 running within a web browser 110, a plugin 108, and an ARM 64-bit processor 122. Each of these components is described in further detail below.

Computing system 102 is an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications, e.g., web browser 110 or web application 116, that perform specialized tasks for the user. For example, computing system 102 may include applications such as an email client, address book, document editor, web browser 110, and/or media player. To perform tasks for the user, applications may obtain the use of hardware resources, e.g., ARM 64-bit processor 122, memory, I/O components, network interface card, graphics-processing unit (GPU), and so on, on computing system 102 from the operating system, as well as interact with the user through a hardware and/or software framework provided by the operating system, as described below.

In some cases, computing system 102 includes functionality to obtain and/or execute applications using a network connection. In particular, computing system 102 may obtain web application 116 from one or more servers, e.g., server 1 104 or server x 106, using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a Rich Internet Application (RIA).

Furthermore, web application 116 may execute on computing system 102 regardless of the operating system, drivers, or hardware associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

To enable native performance for web applications, computing system 102 may obtain and execute a native code module 118 within plugin 108. Like web application 116, native code module 118 may be obtained from one or more servers, e.g., server 1 104 or server x 106, by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application. Furthermore, native code module 118 may be obtained from local storage, e.g., a browser cache, on computing system 102 instead of from a server.

More specifically, native code module 118 is a software module containing native code that runs directly on the ARM 64-bit processor 122. As a result, native code module 118 may be used to perform tasks that require substantial access to CPU resources on computing system 102. For example, native code module 118 may be used by web application 116 to provide computationally intensive features associated with physics simulation, signal processing, audio codecs, video codecs, artificial intelligence, modeling, flexible high-throughput cryptography, and/or multimedia editing and analysis.

Plugin 108 includes a variety of mechanisms to ensure the safe execution of native code module 118. In particular, native code module 118 is validated by a validator 112 provided by plugin 108 prior to execution. Native code module validation is described in U.S. patent application Ser. No. 12/117,634, filed 8 May 2008, which is incorporated herein by reference.

Before native code module 118 is validated, native code module 118 is loaded into a secure runtime environment 114 provided by plugin 108. Optionally, some or all of the validation may be performed before native code module 118 is loaded into secure runtime environment 114. Native code execution in a secure runtime environment is described in U.S. patent application Ser. No. 12/117,650, filed 8 May 2008, which is incorporated herein by reference. Secure runtime environment 114 may also be provided by a web browser extension to web browser 110, or secure runtime environment 114 may be built into web browser 110.

Furthermore, because native code module 118 may include binary code that runs directly on hardware, native code module 118 may be platform-independent with respect to the operating system, web browser 110, and/or other software components on computing system 102. As described in the above-referenced applications, plugin 108 and/or native code module 118 may also include mechanisms for executing on a variety of instruction set architectures, including the use of "fat binaries" and binary translators.

In some cases, the system of FIG. 1 includes functionality to safely execute native code module 118 within an ARM 64-bit ISA. In other words, plugin 108 and web browser 110 may correspond to software modules that execute directly on ARM 64-bit processor 122 using the ARM 64-bit ISA. Moreover, native code module 118 may correspond to a set of ARM 64-bit instructions and data that is loaded into the address space of ARM processor 122 and used to facilitate the execution of web application 116.

Native code module 118 is loaded into memory of computing system 102 for inspection by validator 112. Once loaded into memory, page table protection provided by the operating system of computing system 102 may prevent native code module 118 from being modified. As discussed below with respect to FIG. 2, page table protection may additionally restrict instruction execution in native code module 118 to a code area in the address space, memory stores to the write area in the address space, and memory loads to a read area in the address space.

Validator 112 performs static binary analysis on native code module 118 to ensure that native code module 118 conforms to a set of security constraints. If native code module 118 does not conform to the security constraints, validator 112 may discard native code module 118 prior to loading native code module 118 into secure runtime environment 114.

During analysis of native code module 118, validator 112 ensures that native code module 118 is statically linked at a start address within the code area, by providing a zero-based address range for native code module 118. Validator 112 then sequentially disassembles and/or decodes all executable instructions within native code module 118 that would fall within a defined code area 202 of an address space of secure runtime environment 114. The analysis verifies that the regions specified by the native code module 118 are compatible with the predefined address space organization described below with reference to FIG. 2 and that unused parts of the address space are unmapped. During disassembly, validator 112 may verify that native code module 118 does not contain any restricted instructions, such as instructions that directly invoke the operating system, hardware performance instructions, and/or complex addressing modes, or any constructions with irregular control flow, e.g., direct branches that bypass diffuser instructions while leading to the execution of corresponding unsafe instructions. As discussed below, validator 112 may also verify that instructions can be executed only from code area 202 or trusted area 206. Optionally, the code area 202 can include a secondary trusted area. The secondary trusted area can be used to include the only instructions that are permitted to jump from the code area to the trusted code, and the validator 112 may verify that this condition is satisfied. Alternatively, a secondary trust area can be mapped into an otherwise unmapped area and the instructions jumping to the trusted code can be placed there by the validator 112 or the secure runtime environment 114.

Once native code module 118 is validated, native code module 118 is executed in secure runtime environment 114. As described in the above-referenced applications, secure runtime environment 114 may load and launch native code module 118 from memory; provide an execution environment that includes communications, threads, memory management, and debugging support for native code module 118; moderate access to system resources according to an access policy for native code module 118; and/or support the isolated execution of multiple native code modules on computing system 102. Consequently, secure runtime environment 114 may provide additional mechanisms for ensuring the secure execution of native code module 118 on computing system 102. In particular, secure runtime environment 114 may restrict access from native code module 118 to registers, memory, and/or other resources associated with the ARM 64-bit ISA.

As discussed in the above-referenced applications, validator 112 enforces security for native code module 118 by verifying that diffuser instructions are present to mask certain instructions within native code module 118. Diffuser instructions are instructions that are combined in a verifiable way with unsafe instructions, i.e., instructions that have the potential to violate security constraints depending on the state of registers or memory at the time the instructions are executed, e.g., branching to an arbitrary location, or reading or writing to or from an arbitrary memory location. The required diffuser instruction or instruction sequence depends on the type of the unsafe instruction. In some cases, the diffuser instruction or instructions precede the unsafe instruction; in other cases, the diffuser instruction or instructions succeeds the unsafe instruction. The validator ensures that whenever an unsafe instruction is executed, the corresponding diffuser instruction or instructions have been or will be executed, as the case may be. Furthermore, the validator 112 ensures that all diffuser instructions and the associated unsafe instruction are executed sequentially, or at least with no intervening instructions that might compromise the effect of the diffuser instructions, or no intervening instructions at all. Execution of diffuser instructions and their associated unsafe instructions within ARM 64-bit ISAs is discussed in further detail below with reference to FIGS. 3 and 5.

Figure 2:
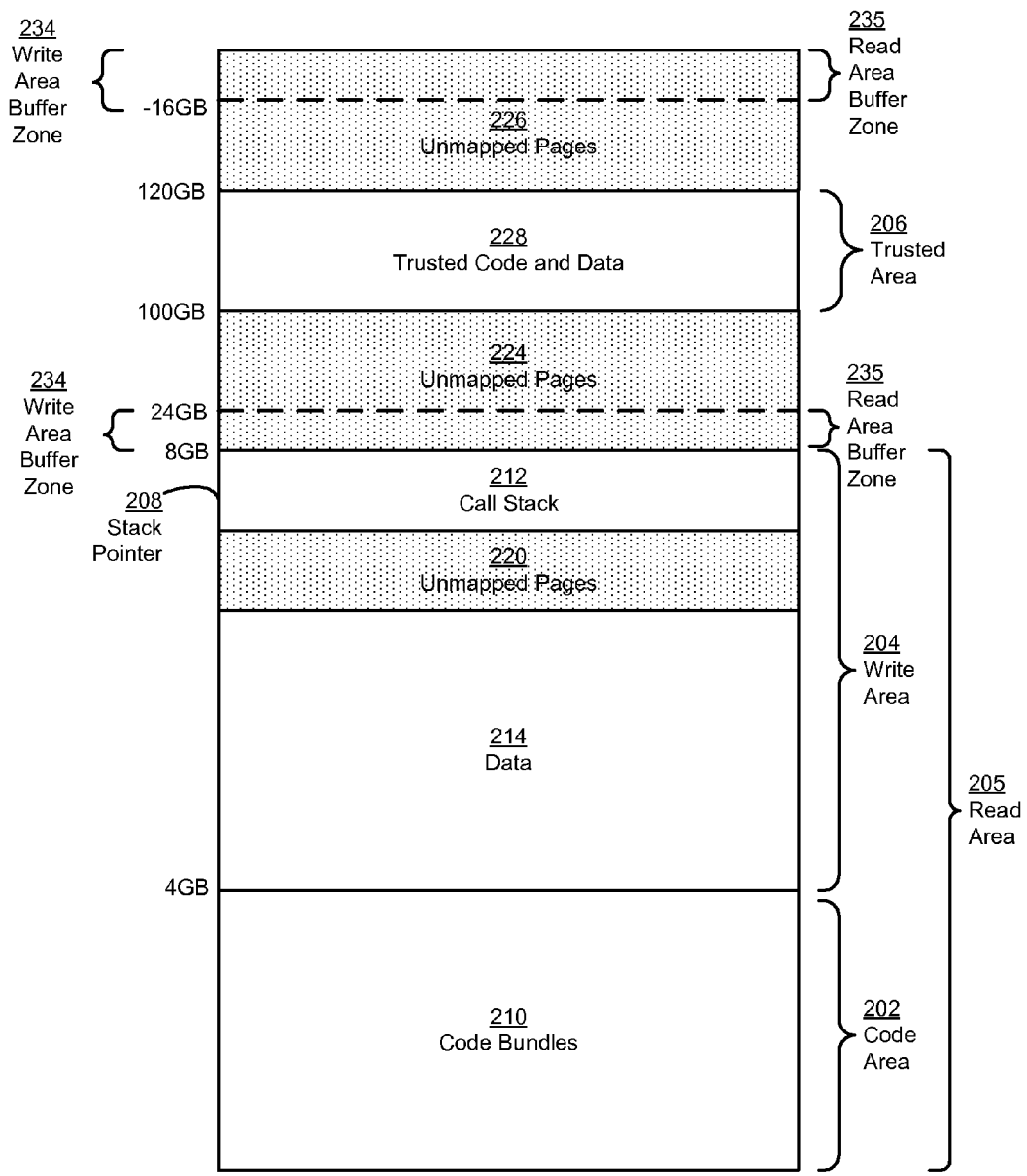
FIG. 2 shows an address space divided into multiple regions.

Code area 202 is a region of the address space of secure runtime environment 114. For example, as illustrated in FIG. 2, code area 202 can be the first 4 gigabytes of memory. Code area 202 is one of many regions into which the address space of secure runtime environment 114 is divided.

Figure 3:
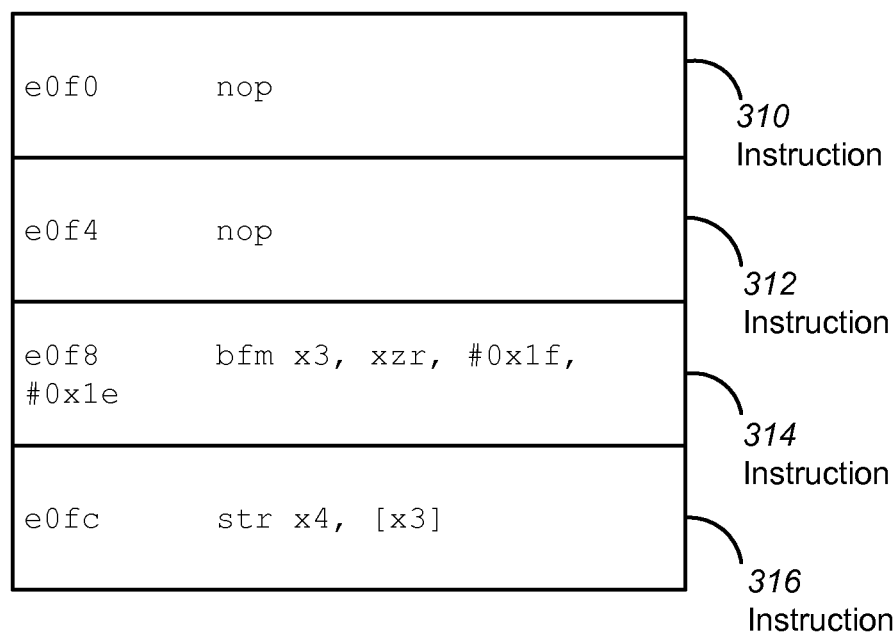
FIGS. 3 and 5 show example code bundles.

Code area 202 is partitioned into equally sized non-overlapping and adjacent code bundles 210. FIG. 3 shows an example code bundle. Each code bundle has a start address, in bytes, that is a multiple of a predetermined power of two, e.g., 16 or 32. To allow simple diffuser instructions to be used, code area 202 ends at an address that is a one less than a power of two. Note that if the native code module does not use all of the code area 202, the secure runtime environment 114 can leave the unused portion unmapped.

Figure 5:
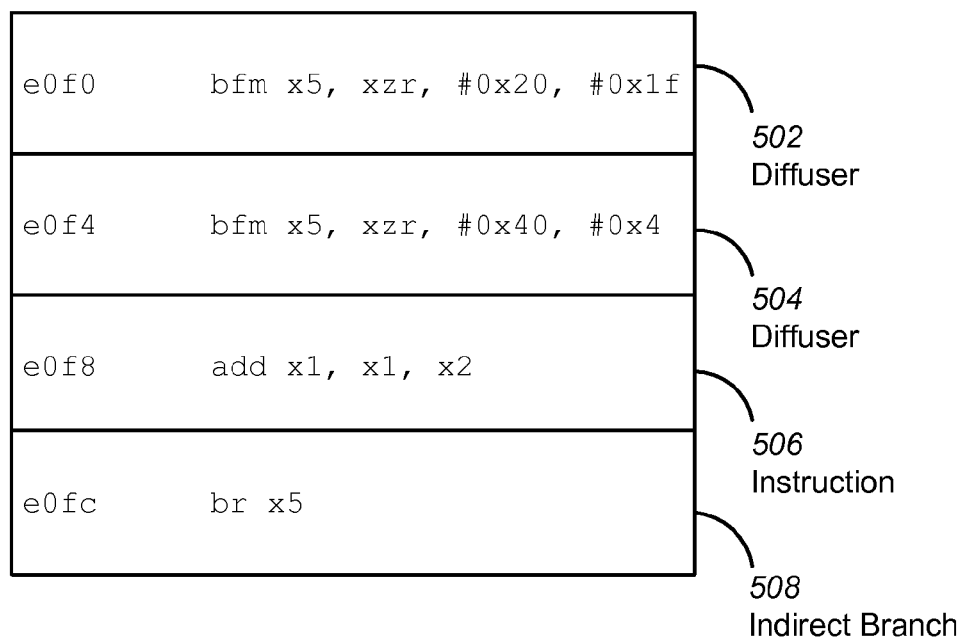

Validator 112 verifies that each indirect branch instruction of native code module 118 is masked by one or more appropriate diffuser instructions. FIG. 5 shows an example indirect branch instruction 508 masked by two diffuser instructions 502 and 504, where xzr is a reference to a 64-bit zero register, r5 is the 64-bit destination register of indirect branch instruction 508, and x5 is a reference to the 64-bit value of r5. The first diffuser instruction 502 clears one or more most significant bits of a destination register of indirect branch instruction 508, such that a destination address of indirect branch instruction 508 must lie within code area 202. For example, if code area 202 is the first 4 Gbytes of memory, then diffuser instruction 502 would then clear the 32 most significant bits of the destination register r5 of indirect branch instruction 508. The second diffuser instruction 504 clears one or more least significant bits of the destination register r5 of indirect branch instruction 508, such that the destination address must be the start of one of the code bundles 210. The second diffuser does so by ensuring that the destination address must be a multiple of the same predetermined power of two as referenced by code bundles 210 above. For example, if the start addresses of code bundles 210 are multiples of 16 bytes, diffuser instruction 504 would clear the 4 least significant bits of the destination register r5 of indirect branch instruction 508. The A64 instruction set provides an AND instruction for certain 64-bit immediate values, including all values necessary for clearing arbitrary numbers of the bits at the top and bottom simultaneously. Thus, this instruction can be used as a single diffuser instruction for all scenarios described in this specification.

In some cases, diffuser instruction 502 clears one or more most significant bits of the destination register r5 of indirect branch instruction 508 such that the destination address of indirect branch instruction 508 must lie within the code area. For example, if code area 202 were the first 2 Gbytes of memory, then diffuser instruction 502 would clear the 33 most significant bits. Consequently, the destination addresses of indirect branch instructions in native code module 118 would never lie outside code area 202.

Validator 112 verifies that diffuser instruction 502 and diffuser instruction 504 occur before and in the same code bundle as indirect branch instruction 508. Validator 112 also verifies that no other instruction that could modify the destination register r5 occurs between either of the two diffuser instructions 502 and 504 and the indirect branch instruction 508. For example, validator 112 allows intervening instruction 506 to be a nop instruction or an instruction that modifies an unrelated register r1, as shown in FIG. 2. However, validator 112 does not allow intervening instruction 506 to be an instruction that modifies the destination register r5.

Validator 112 also enforces that the entire code area 202 is checked for forbidden instructions and that instructions can be executed only from code area 202 and trusted area 206. Specifically, the ARM 64-bit instruction set can have some instructions that are forbidden, e.g., msr instructions. Every 4-byte block in code area 202 is interpreted as an instruction and validated, such that no 4-byte block in code area 202 is a forbidden instruction.

In some scenarios, validator 112 enforces that instructions can be executed only from code area 202 or trusted area 206 by ensuring that all the address space of secure runtime environment 114, other than code area 202 and trusted area 206, is marked as non-executable or is unmapped.

In some scenarios, validator 112 enforces that instructions can be executed only from code area 202 or trusted area 206 by verifying that branch instructions in native code module 118 can only branch to code area 202 or trusted area 206. For example, validator 112 verifies that all indirect branch instructions in native code module 118 are masked such that their destination addresses must lie within the code area, by clearing one or more most significant bits from the destination register. Validator 112 also verifies that all direct branch instructions are pointing to either code area 202 or trusted area 206. Consequently, validator 112 can further enforce that all branches to trusted area 206 are direct branches.

In some scenarios, validator 112 further restricts branches into code area 202 and trusted area 206. In particular, code area 202 is partitioned into multiple equally sized code bundles. Validator 112 verifies that all indirect branches into code area 202 will have a destination address at the start of one of the code bundles. In some implementations, validator 112 allows direct branches to a location within a code bundle if the location is not between an unsafe instruction and its associated one or more diffuser instructions. Furthermore, safe entry points into trusted area 206 may be defined. The safe entry points may be specified in a configuration file or other form of data provided to validator 112. For example, secure runtime environment 114 may publish safe entry points into trusted area 206 for use by validator 112. Safe entry points are addresses through which native code module 118 is permitted to interact with computing system 102, e.g., to access I/O components, network interface cards, GPUs, and so on. Validator 112 verifies that direct branches into trusted area 206 will be to one of the safe entry points.

Validator 112 and secure runtime environment 114 additionally constrain store instructions in native code module 118. Validator 112 and secure runtime environment 114 may also constrain load instructions in native code module 118. Validator 112 verifies that one or more diffuser instructions exist for each load or store instruction in native code module 118, and verify that the load or store instructions use specific addressing modes. Validator 112 also enforces the use of unmapped pages or page protection to bound a valid memory region and call stack of native code module 118. Constraining store instructions is discussed in further detail below with respect to FIG. 2.

FIG. 2 shows an address space that is divided into multiple regions. The address space corresponds to a 64-bit address space of an ARM 64-bit processor, e.g., ARM 64-bit processor 122 of FIG. 1, into which a native code module, e.g., native code module 118 of FIG. 1, is loaded. As illustrated in FIG. 2, the address space includes a code area 202, a write area 204, a read area 205, and a trusted area 206.

Described most generally, the multiple regions include a writable region, which is not necessarily zero based; and a bigger, readable region, which is zero based, that the base registers are restricted to; and buffer zones around the readable region, which make it feasible to permit addressing modes that may compute an effective address by adding a shifted 32-bit value to a base value. In each case, the region is nominally zero based, in the sense that the diffuser instructions do not prevent (i) stores to access the entire range from zero to the top of the write area, (ii) loads to access the entire range from zero to the top of the read area, (iii) indirect branches to branch to bundles from zero to the top of the code area. However, page memory protection established by the operating system on behalf of the validator does impose additional restrictions, e.g., effectively carving out the code area from the write area, because self-modifying code cannot be permitted. In the example division of the address space described below, the writable region corresponds to write area 204, the readable region corresponds to read area 205, and the buffer zones correspond to unmapped pages 220, 224, 226.

In some cases, code area 202 begins at address 0 and extends to an address that is one less than a power of two. Alternatively, code area 202 may begin at a different address other than 0 (zero) and may not extend to an address that is a power of two. If a code area begins above zero, the pages below the code area would be marked non-executable because the diffuser instruction would not prevent branches to the low addresses. For example, code region 202 can be the first 3 Gbytes of the address space. Write area 204 begins where code area 202 ends and extends to an address that is one less than a higher power of two, e.g., between 3 Gbytes and 8 Gbytes of the address space. Alternatively, write area 204 may begin at a different address other than the end of code area 202 and may not extend to an address that is one less than a power of two. Read area 205 begins at address 0 (zero) and extends to an address that is one less than a power of two, e.g., the first 8 Gbytes of the address space. Alternatively, read area 205 may begin at a different address other than 0 (zero) and may not extend to an address that is one less than a power of two. Finally, trusted area 206 spans some other region of the address space, e.g., between 100 Gbytes and 120 Gbytes of the address space. Code area 202 may contain only code 210, while write area 204 and read area 205 may contain a call stack 212 and data 214. Unmapped pages 224 and 226 may bound trusted code and data 228 used to facilitate the execution of the native code module, such as code and data for a validator, e.g., validator 112 of FIG. 1, secure runtime environment, e.g., secure runtime environment 114 of FIG. 1, and/or trusted services associated with the native code module.

Write area buffer zones 234 span regions of the address space on both sides of write area 202, of size 16 Gbytes each. For example, as illustrated in FIG. 2, if write area 204 were the region of the address space between 3 Gbytes and 8 Gbytes, one of the write area buffer zones 234 would span the region of the address space between 8 Gbytes and 24 Gbytes on one side, and another write area buffer zone 234 would "wrap around" to the upper end of the address space, spanning the region between 0 and 3 Gbytes and between 13 Gbytes from the end of the address space until the end of the address space.

Similarly, if the address space includes a read area, read area buffer zones 235 would span regions of the address space on both sides of read area 205, of size 16 Gbytes each. For example, if read area 205 is the first 8 Gbytes of memory, then read area buffer zones 235 would be between 8 Gbytes and 24 Gbytes and between 16 Gbytes from the end of the address space until the end of the address space.

As described in the above-referenced applications, trampoline instructions may be used by the native code module to access resources and/or services associated with trusted region 206. However, validator 112 and/or secure runtime environment 114 may prevent the native code module from inappropriately accessing trusted region 206 and/or other portions of the address space.

Secure runtime environment 114 includes page table protection. Page table protection may be provided by the ARM 64-bit processor and/or an operating system associated with the address space and may restrict the native code module's access to various parts of the address space. First, page table protection may restrict access to code area 202, write area 204, and read area 205. As described above, code area 202 may begin at address 0. Moreover, after the native code module is loaded into code area 202, page table protection may prevent code area 202 from subsequent modification.

In some scenarios, page table protection may also be used to prevent the native code module from executing portions of the address space outside of code area 202. For example, the use of execute-never, or XN, bits in ARM 64-bit page table entries may prevent the native code module from executing pages in write area 204. Bits in page table entries may also be set to restrict portions of the address space to non-writable access and/or read-write access by the native code module. For example, the memory pages of write area buffer zones 234 can be set to non-writable, or they can be unmapped. For example, string constants associated with the native code module may be stored in a non-writable section of read area 205 that is enforced using page table protection. Memory that is not intended to be read, e.g., read area buffer zone 235, can be unmapped or marked as non-readable. As discussed below, page table protection associated with unmapped pages 220, 224, and 226 may effectively constrain the native code module's memory references and stack pointer 208 updates to code area 202, write area 204, and/or read area 205 while minimizing performance overhead.

In some implementations, the stack point 208 is allowed to be anywhere in the write area 205, which has the read area buffer zone 235 which has already been described. For load and store instructions with the stack pointer 208, the validator limits the instruction modes to ones using a register or a register plus a scaled offset.

In some implementations, validator 112 enforces storage of valid data addresses, e.g., within data region 204, in stack pointer 208, e.g., the sp register, used to reference call stack 212. Stack pointer 208 may be initialized with an address within call stack 212. To constrain stack pointer 208 within call stack 212, the validator 112 may ensure that call stack 212 is bound with unmapped pages 220 and 224, enable store instructions that increment or decrement stack pointer 208 without masking, mask direct updates to stack pointer 208 to keep a value of stack pointer 208 within call stack 212, follow instructions that change stack pointer 208 with diffuser instructions so that stack pointer 208 is within call stack 212 the next time stack pointer 208 is used, or any combination of these techniques.

More specifically, having unmapped pages 220 and 224 may permit the use of stack-relative store instructions without masking if the immediate offset plus the largest store is smaller than a size of one or more of the unmapped pages, e.g., 4 Kbytes, which may be pages of a buffer zone. Immediate offsets are 12-bit numbers, may be left-shifted by up to 12 bits, and may be scaled by increments of 4 bytes. As a result, store instructions, e.g., stp and ldp instructions, that increment or decrement stack pointer 208 may be executed without masking Because such instructions make relatively small adjustments to stack pointer 208, the adjustments either keep stack pointer 208 within call stack 212 or cause segmentation violations if stack pointer 208 exceeds the bounds of call stack 212 and references an instruction in an unmapped page 220 or 224. The secure runtime environment 114 may then respond to the segmentation violations by terminating the execution of the native code module and/or triggering traps that handle the segmentation violations.

In addition, direct updates to stack pointer 208 may be made using the add, sub, and/or mov instructions using immediate offsets, while instructions such as ldr and ldp may be disallowed in direct updates to stack pointer 208. Alternatively, load instructions that load a value into the stack pointer 208 may be allowed by the validator 112 like move instructions, if followed by an appropriate diffuser instruction or instructions; and instructions that update the stack pointer 208 as a side effect of using a pre- or post-update addressing mode with the stack pointer 208 may be allowed without any diffuser instructions. Direct updates with offsets larger than the size of unmapped pages 220 and 224 may be followed immediately by a masking instruction that keeps stack pointer 208 within call stack 212 and/or unmapped pages 220 and 224. For example, a code bundle that contains a direct update to stack pointer 208 may include the following:

sub sp, sp, #0xdc
bfm sp, xzr, #0x1f, #0x1e

To constrain non-stack-relative store instructions that use a 64-bit register, validator 112 allows addressing modes that calculate store addresses by combining a valid 64-bit base register with an immediate offset or with a scaled extended 32-bit register offset, while disabling addressing modes that calculate store addresses by adding two 64-bit registers together. In particular, if validator 112 detects that at least one store instruction contains an extended register offset, it enforces that write area buffer zones 234 must each be at least 16 Gbytes in size. (Optionally, this address mode can be prohibited, in which case the buffer zones can be smaller.) These immediate offsets may thus cause displacements of at most 64 Mbytes. Store instructions with extended register offsets use a 32-bit value contained in a 64-bit offset register as an offset value. These offset values can be scaled by 4 bytes, wherein the offset value is the 32-bit value multiplied by 4 bytes. These scaled extended 32-bit register offsets may cause displacements of at most 16 Gbytes. Consequently, immediate offsets and scaled extended register offsets of register values within the address range of write area 204 remain either within write area 204 or generate memory references into write area buffer zones 234 that can cause segmentation violations.

Furthermore, validator 112 verifies that non-stack-relative store instructions are masked to ensure that register values used in the non-stack-relative store instructions fall within write area 204 or one of the write area buffer zones 234. For example, a code bundle that contains a non-stack-relative store instruction may include the following instructions:

bfm x2, xzr, #0x1f, #0x1e
str x3, [x2, #−1248]

Those skilled in the art will also appreciate that the same mechanisms described above may be used to constrain load instructions in the native code module. In particular, page table protection; unmapped pages 220, 224, and 226; restrictions on modifications to stack pointer 208; and/or masking base registers may also be used to constrain load addresses to read area 205 or read area buffer zones 235. For example, load addresses may be computed by combining a valid base register with an immediate offset and/or by masking values in the base register. As a result, the validator and secure runtime environment may also include functionality to constrain some or all load instructions in the native code module. Alternatively, the validator and secure runtime environment can constrain none of the load instructions in the native code module, allowing the native code module to read from any portion of the address space.

Validator 112 also verifies that each memory page of write area buffer zones 234 is marked as non-writable or is unmapped. Consequently, store instructions that attempt to address write area buffer zones 234 will cause segmentation violations.

If validator 112 is constraining load instructions, validator 112 will also verify that each memory page of read area buffer zones 235 is unmapped or marked as non-readable. Consequently, load instructions that attempt to address read area buffer zones 235 will cause segmentation violations.

Furthermore, the validator and secure runtime environment may constrain any combination of non-stack-relative loads, non-stack-relative stores, stack-relative loads, and stack-relative stores. Such selective constraining of loads and/or stores may be based on security and/or performance considerations associated with executing the native code module. For example, stack pointer 208 may be restricted to code area 202 and write area 204, e.g., the lower 8 Gbytes of the address space, instead of to call stack 212 to reduce the amount of masking used in stack-relative loads and/or stores.

FIG. 3 shows an example code block. In particular, FIG. 3 shows an aligned 16-byte code block containing an example diffuser instruction. The code block is stored within a code region, e.g., code area 202 of FIG. 2, of the native code module. Moreover, the diffuser instruction is used to mask an instruction 316, e.g., str x4, [x3], in a native code module, e.g., native code module 118 of FIG. 1. As illustrated in FIG. 3, the 16-byte code block is divided into four sections at offsets of e0f0, e0f4, e0f8, and e0fc, with each section containing a four-byte instruction 310, 312, 314, or 316.

Figure 4:
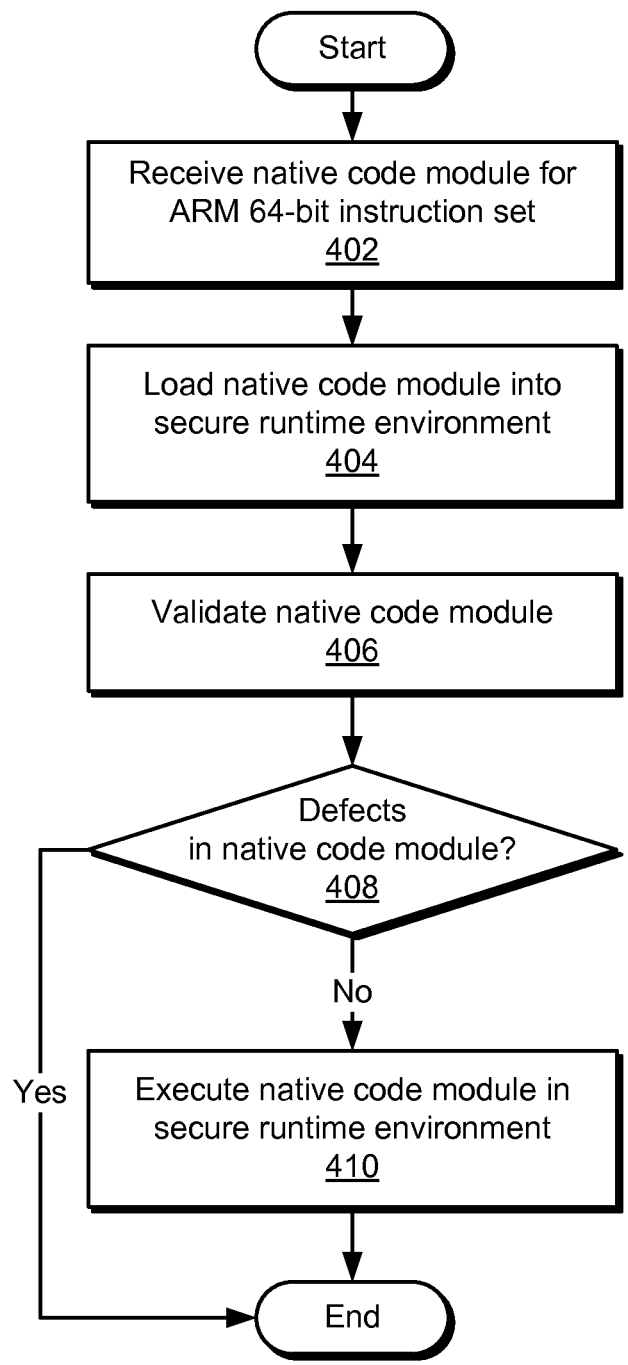
FIG. 4 is a flowchart illustrating a process of executing a native code module in a secure runtime environment.

FIG. 4 is a flowchart illustrating a process of executing a native code module in a secure runtime environment. In some scenarios, one or more of the steps may be omitted, repeated, and/or performed in a different order. Accordingly, the specific arrangement of steps shown in FIG. 4 should not be construed as limiting the scope of the technique.

First, the native code module for an ARM 64-bit instruction set is received (operation 402). The native code module may be received from one or more servers and/or compiled from source code and/or translated from some form of intermediate code into native code. In addition, the native code module may be used to facilitate the execution of a web application, such as a JavaScript application. For example, the native code module may be used to perform computationally intensive operations for the web application.

Next, the native code module is loaded into a secure runtime environment for an ARM 64-bit ISA (operation 404). In particular, the native code module may be loaded into a valid memory region, e.g., code area 202, write area 204, and read area 205 of FIG. 2, in the 64-bit address space of the ARM 64-bit ISA. As part of the loading, unused parts of the address space are unmapped if necessary and the buffer zones are established. The loaded native code module is then validated (operation 406) prior to executing the native code module. During validation, the native code module may be inspected for conformity to a set of security constraints. In particular, the native code module may be inspected to detect defects that do not conform to the security constraints (operation 408). Specifically, the native code module is validated as described above. If the native code module does not conform to the security constraints, e.g., if the validator detects defects in the native code, the native code module is discarded without having been executed.

If the validator does not detect defects in the native code module, the native code module is executed in the secure runtime environment (operation 410). The secure runtime environment may be provided by a plugin associated with the web browser, a browser extension to the web browser, and/or a component within the web browser.

Consequently, the validation of the native code module may enable secure execution of the native code module on ARM 64-bit hardware with low performance overhead while maintaining portability and platform independence across different web browsers and operating systems. In particular, the validation may provide per-thread protection that constrains threads used to execute untrusted code in the native code module while allowing trusted code used to validate and execute the native code module to execute without constraints. Furthermore, the validation may improve performance by minimizing overhead associated with masking store and load instructions. Finally, the direct execution of the native code module on ARM 64-bit hardware may allow the native code module to execute on a variety of ARM 64-bit processors and operating systems without modification.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims. What is claimed is:

What is claimed is:

1. A method, performed by one or more computers, comprising:
    receiving a native code module for an ARM 64-bit instruction set, wherein:
        the instruction set comprises a plurality of types of store instructions;
        one or more of the plurality of types of store instructions are forbidden instructions; and
        the native code module comprises one or more store instructions;
    loading the native code module into a secure runtime environment, wherein an address space of the secure runtime environment is divided into a plurality of regions, and wherein one of the regions is a write area;
    validating the native code module, comprising:
        verifying that no reachable store instruction in the native code module is a forbidden instruction; and
        verifying that, for each reachable store instruction in the native code module that uses a 64-bit base register, the 64-bit base register used by the instruction is masked by one or more diffuser instructions;
    defining a first write area buffer zone above and adjacent to the write area;
    defining a second write area buffer zone below and adjacent to the write area;
    determining that a first reachable store instruction in the native code module has an extended register offset, wherein a destination address of the first reachable store instruction is determined as a sum of an address contained in a first base register and a scaled 32-bit offset value contained in a first 64-bit offset register; and
    determining that each write area buffer zone is at least 16 gigabytes in size.

2. The method of claim 1, wherein:
    the native code module comprises one or more branch instructions;
    one of the plurality of regions is a code area;
    the code area is partitioned into equally sized code bundles;
    validating the native code module further comprises:
        verifying that, for each indirect branch instruction having a respective destination address pointing into the code area, the respective destination address of the branch instruction is a start of one of the code bundles;
        verifying that, for each direct branch instruction having a respective destination address pointing into the code area, executing the branch instruction does not allow an unsafe instruction to be executed without its corresponding diffuser instruction or instructions being executed;
        verifying that, for each reachable store instruction in the native code module that uses a 64-bit base register, the one or more diffuser instructions occur before the store instruction in the same code bundle as the store instruction; and
        verifying that no instruction that could modify the base register occurs after any of the one or more diffuser instructions and before the store instruction; and
    the one or more diffuser instructions include a first instruction that clears one or more most significant bits of the base register, such that a destination address of the store instruction must lie within the write area or one of the write area buffer zones.

3. The method of claim 1, further comprising verifying that each memory page of the write area buffer zones is marked as non-writable or is unmapped.

4. A method, performed by one or more computers, comprising:
    receiving a native code module for an ARM 64-bit instruction set, wherein:
        the instruction set comprises a plurality of types of load instructions;
        one or more of the plurality of types of load instructions are forbidden instructions; and
    loading the native code module into a secure runtime environment, wherein an address space of the secure runtime environment is divided into a plurality of regions, and wherein one of the regions is a read area;
    validating the native code module, comprising:
        verifying that no reachable load instruction in the native code module is a forbidden instruction; and
        verifying that, for each reachable load instruction in the native code module that uses a 64-bit base register, the 64-bit base register used by the instruction is masked by one or more diffuser instructions;
    defining a first read area buffer zone above and adjacent to the read area;
    defining a second read area buffer zone below and adjacent to the read area;
    determining that a first reachable load instruction in the native code module has an extended register offset, wherein a source address of the first reachable load instruction is determined as a sum of an address contained in a first base register and a scaled 32-bit offset value contained in a first 64-bit offset register; and
    determining that each read area buffer zone is at least 16 gigabytes in size.

5. The method of claim 4, wherein:
the native code module comprises one or more branch instructions;
one of the plurality of regions is a code area;
the code area is partitioned into equally sized code bundles;
validating the native code module further comprises:
verifying that, for each branch instruction having a respective destination address pointing into the code area, the respective destination address of the branch instruction is a start of one of the code bundles;
verifying that, for each reachable load instruction in the native code module that uses a 64-bit base register, the one or more diffuser instructions occur before the load instruction in the same code bundles as the load instruction; and
verifying that no instruction that could modify the base register occurs after any of the one or more diffuser instructions and before the load instruction; and
the one or more diffuser instructions include a first instruction that clears one or more most significant bits of the base register, such that a source address of the load instruction must lie within the read area or one of the read area buffer zones.

6. The method of claim 4, further comprising verifying that each memory page of the read area buffer zones is unmapped or marked as non-readable.

7. A method, performed by one or more computers, comprising:
receiving a native code module for an ARM 64-bit instruction set, wherein the instruction set comprises one or more types of forbidden instructions;
loading the native code module into a secure runtime environment, wherein an address space of the secure runtime environment is divided into at least a code area and a non-overlapping trusted area;
validating the native code module, comprising:
verifying that the code area includes no forbidden instructions; and
verifying that instructions can be executed only from the code area or the trusted area.

8. The method of claim 7, wherein verifying that instructions can be executed only from the code area or the trusted area comprises:
verifying that all of the address space other than the code area and the trusted area is marked as non-executable or is unmapped.

9. The method of claim 7, wherein verifying that instructions can be executed only from the code area or the trusted area comprises:
verifying that branch instructions can only branch to the code area or the trusted area.

10. The method of claim 9, wherein verifying that instructions can be executed only from the code area or the trusted area further comprises:
partitioning the code area into equally sized code bundles, wherein each code bundle has a start address;
verifying that branch instructions that branch into the code area must branch to the start address of one of the equally sized code bundles; and
verifying that each branch instruction that branches into the trusted area must branch to a respective safe entry point.

11. A method, performed by one or more computers, comprising:
receiving a native code module for an ARM 64-bit instruction set, wherein the native code module comprises one or more indirect branch instructions, each indirect branch instruction having a respective destination address contained in a respective 64-bit destination register;
loading the native code module into a secure runtime environment, wherein an address space of the secure runtime environment is divided into a plurality of regions, and wherein one of the regions is a code area;
partitioning the code area into equally sized code bundles, each code bundle having a respective start address, wherein each start address is a multiple of a predetermined power of two; and
validating the native code module, comprising:
verifying that, for each indirect branch instruction in the native code module, one or more corresponding diffuser instructions exist, wherein the combined effect of the one or more diffuser instructions is to clear one or more of the most significant bits of the destination register such that the destination address must lie within the code area and to clear one or more least significant bits of the destination register, such that the destination address must be a multiple of the predetermined power of two.

12. The method of claim 11, wherein validating the native code module further comprises, for each indirect branch instruction in the native code module:
verifying that the one or more corresponding diffuser instructions occur before and in the same bundle as the indirect branch instruction; and
verifying that no instruction that could modify the destination register occurs between the one or more corresponding diffuser instructions and the indirect branch instruction.

13. The method of claim 11, wherein the one or more corresponding diffuser instructions include a first diffuser instruction that clears one or more most significant bits of the destination register, such that the destination address must lie within the code area, and a second diffuser instruction that clears one or more least significant bits of the destination register such that the destination address must be a multiple of the predetermined power of two.

14. A system comprising:
one or more processors configured to interact with a machine readable storage medium in order to perform operations including:
receiving a native code module for an ARM 64-bit instruction set, wherein:
the instruction set comprises a plurality of types of store instructions;
one or more of the plurality of types of store instructions are forbidden instructions; and
the native code module comprises one or more store instructions;
loading the native code module into a secure runtime environment, wherein an address space of the secure runtime environment is divided into a plurality of regions, and wherein one of the regions is a write area;
validating the native code module, comprising:
verifying that no reachable store instruction in the native code module is a forbidden instruction; and
verifying that, for each reachable store instruction in the native code module that uses a 64-bit base register, the 64-bit base register used by the instruction is masked by one or more diffuser instructions;
defining a first write area buffer zone above and adjacent to the write area;
defining a second write area buffer zone below and adjacent to the write area;

19 determining that a first reachable store instruction in the native code module has an extended register offset, wherein a destination address of the first reachable store instruction is determined as a sum of an address contained in a first base register and a scaled 32-bit offset value contained in a first 64-bit offset register; and determining that each write area buffer zone is at least 16 gigabytes in size.

15. The system of claim 14, wherein:

the native code module comprises one or more branch instructions;

one of the plurality of regions is a code area;

the code area is partitioned into equally sized code bundles;

validating the native code module further comprises:

verifying that, for each branch instruction having a respective destination address pointing into the code area, the respective destination address of the branch instruction is a start of one of the code bundles;

verifying that, for each reachable store instruction in the native code module that uses a 64-bit base register, the one or more diffuser instructions occur before the store instruction in the same code bundle as the store instruction; and verifying that no instruction that could modify the base register occurs after any of the one or more diffuser instructions and before the store instruction; and the one or more diffuser instructions include a first instruction that clears one or more most significant bits of the base register, such that a destination address of the store instruction must lie within the write area or one of the write area buffer zones.

16. The system of claim 14, wherein the operations further comprise verifying that each memory page of the write area buffer zones is marked as non-writable or is unmapped.

17. A system comprising:

one or more processors configured to interact with a machine readable storage medium in order to perform operations including:

receiving a native code module for an ARM 64-bit instruction set, wherein:

the instruction set comprises a plurality of types of load instructions;

one or more of the plurality of types of load instructions are forbidden instructions; and loading the native code module into a secure runtime environment, wherein an address space of the secure runtime environment is divided into a plurality of regions, and wherein one of the regions is a read area;

validating the native code module, comprising:

verifying that no reachable load instruction in the native code module is a forbidden instruction; and verifying that, for each reachable load instruction in the native code module that uses a 64-bit base register, the 64-bit base register used by the instruction is masked by one or more diffuser instructions;

defining a first read area buffer zone above and adjacent to the read area;

defining a second read area buffer zone below and adjacent to the read area;

determining that a first reachable load instruction in the native code module has an extended register offset, wherein a source address of the first reachable load instruction is determined as a sum of an address contained in a first base register and a scaled 32-bit offset value contained in a first 64-bit offset register; and

20 determining that each read area buffer zone is at least 16 gigabytes in size.

18. The system of claim 17, wherein:

the native code module comprises one or more branch instructions;

one of the plurality of regions is a code area;

the code area is partitioned into equally sized code bundles;

validating the native code module further comprises:

verifying that, for each branch instruction having a respective destination address pointing into the code area, the respective destination address of the branch instruction is a start of one of the code bundles;

verifying that, for each reachable load instruction in the native code module that uses a 64-bit base register, the one or more diffuser instructions occur before the load instruction in the same code bundles as the load instruction; and verifying that no instruction that could modify the base register occurs after any of the one or more diffuser instructions and before the load instruction; and the one or more diffuser instructions include a first instruction that clears one or more most significant bits of the base register, such that a source address of the load instruction must lie within the read area or one of the read area buffer zones.

19. The system of claim 17, wherein the operations further comprise verifying that each memory page of the read area buffer zones is unmapped or marked as non-readable.

20. A system comprising:

one or more processors configured to interact with a machine readable storage medium in order to perform operations including:

receiving a native code module for an ARM 64-bit instruction set, wherein the instruction set comprises one or more types of forbidden instructions;

loading the native code module into a secure runtime environment, wherein an address space of the secure runtime environment is divided into at least a code area and a non-overlapping trusted area;

validating the native code module, comprising:

verifying that the code area includes no forbidden instructions; and verifying that instructions can be executed only from the code area or the trusted area.

21. The system of claim 20, wherein verifying that instructions can be executed only from the code area or the trusted area comprises:

verifying that all of the address space other than the code area and the trusted area is marked as non-executable or is unmapped.

22. The system of claim 20, wherein verifying that instructions can be executed only from the code area or the trusted area comprises:

verifying that branch instructions can only branch to the code area or the trusted area.

23. The system of claim 22, wherein verifying that instructions can be executed only from the code area or the trusted area further comprises:

partitioning the code area into equally sized code bundles, wherein each code bundle has a start address;

verifying that branch instructions that branch into the code area must branch to the start address of one of the equally sized code bundles; and verifying that each branch instruction that branches into the trusted area must branch to a respective safe entry point.

24. A system comprising:
one or more processors configured to interact with a machine readable storage medium in order to perform operations including:
receiving a native code module for an ARM 64-bit instruction set, wherein the native code module comprises one or more indirect branch instructions, each indirect branch instruction having a respective destination address contained in a respective 64-bit destination register;
loading the native code module into a secure runtime environment, wherein an address space of the secure runtime environment is divided into a plurality of regions, and wherein one of the regions is a code area;
partitioning the code area into equally sized code bundles, each code bundle having a respective start address, wherein each start address is a multiple of a predetermined power of two; and
validating the native code module, comprising:
verifying that, for each indirect branch instruction in the native code module, one or more corresponding diffuser instructions exist, wherein the combined effect of the one or more diffuser instructions is to clear one or more of the most significant bits of the destination register such that the destination address must lie within the code area and to clear one or more least significant bits of the destination register, such that the destination address must be a multiple of the predetermined power of two.

25. The system of claim 24, wherein validating the native code module further comprises, for each indirect branch instruction in the native code module:
verifying that the one or more corresponding diffuser instructions occur before and in the same bundle as the indirect branch instruction; and
verifying that no instruction that could modify the destination register occurs between the one or more diffuser instructions and the indirect branch instruction.

26. The system of claim 24, wherein the one or more corresponding diffuser instructions include a first diffuser instruction that clears one or more most significant bits of the destination register, such that the destination address must lie within the code area, and a second diffuser instruction that clears one or more least significant bits of the destination register such that the destination address must be a multiple of the predetermined power of two.

27. The system of claim 24, wherein the one or more corresponding diffuser instruction is a single diffuser instruction that clears one or more most significant bits of the destination register, such that the destination address must lie within the code area, and that clears one or more least significant bits of the destination register, such that the destination address must be a multiple of the predetermined power of two.

28. A non-transitory computer storage medium encoded with a computer program, the program comprising instructions that when executed by data processing apparatus cause the data processing apparatus to perform operations comprising:
receiving a native code module for an ARM 64-bit instruction set, wherein:
the instruction set comprises a plurality of types of store instructions;
one or more of the plurality of types of store instructions are forbidden instructions; and
the native code module comprises one or more store instructions;
loading the native code module into a secure runtime environment, wherein an address space of the secure runtime environment is divided into a plurality of regions, and wherein one of the regions is a write area;
validating the native code module, comprising:
verifying that no reachable store instruction in the native code module is a forbidden instruction; and
verifying that, for each reachable store instruction in the native code module that uses a 64-bit base register, the 64-bit base register used by the instruction is masked by one or more diffuser instructions;
defining a first write area buffer zone above and adjacent to the write area;
defining a second write area buffer zone below and adjacent to the write area;
determining that a first reachable store instruction in the native code module has an extended register offset, wherein a destination address of the first reachable store instruction is determined as a sum of an address contained in a first base register and a scaled 32-bit offset value contained in a first 64-bit offset register; and
determining that each write area buffer zone is at least 16 gigabytes in size.

29. The non-transitory computer storage medium of claim 28, wherein:
the native code module comprises one or more branch instructions;
one of the plurality of regions is a code area;
the code area is partitioned into equally sized code bundles;
validating the native code module further comprises:
verifying that, for each branch instruction having a respective destination address pointing into the code area, the respective destination address of the branch instruction is a start of one of the code bundles;
verifying that, for each reachable store instruction in the native code module that uses a 64-bit base register, the one or more diffuser instructions occur before the store instruction in the same code bundle as the store instruction; and
verifying that no instruction that could modify the base register occurs after any of the one or more diffuser instructions and before the store instruction; and
the one or more diffuser instructions include a first instruction that clears one or more most significant bits of the base register, such that a destination address of the store instruction must lie within the write area or one of the write area buffer zones.

30. The non-transitory computer storage medium of claim 28, wherein the operations further comprise verifying that each memory page of the write area buffer zones is marked as non-writable or is unmapped.

31. A non-transitory computer storage medium encoded with a computer program, the program comprising instructions that when executed by data processing apparatus cause the data processing apparatus to perform operations comprising:
receiving a native code module for an ARM 64-bit instruction set, wherein:
the instruction set comprises a plurality of types of load instructions;
one or more of the plurality of types of load instructions are forbidden instructions; and
loading the native code module into a secure runtime environment, wherein an address space of the secure runtime environment is divided into a plurality of regions, and wherein one of the regions is a read area;

validating the native code module, comprising:
- verifying that no reachable load instruction in the native code module is a forbidden instruction; and
- verifying that, for each reachable load instruction in the native code module that uses a 64-bit base register, the 64-bit base register used by the instruction is masked by one or more diffuser instructions;

defining a first read area buffer zone above and adjacent to the read area;

defining a second read area buffer zone below and adjacent to the read area;

determining that a first reachable load instruction in the native code module has an extended register offset, wherein a source address of the first reachable load instruction is determined as a sum of an address contained in a first base register and a scaled 32-bit offset value contained in a first 64-bit offset register; and determining that each read area buffer zone is at least 16 gigabytes in size.

32. The non-transitory computer storage medium of claim 31, wherein:

the native code module comprises one or more branch instructions;

one of the plurality of regions is a code area;

the code area is partitioned into equally sized code bundles;

validating the native code module further comprises:
- verifying that, for each branch instruction having a respective destination address pointing into the code area, the respective destination address of the branch instruction is a start of one of the code bundles;
- verifying that, for each reachable load instruction in the native code module that uses a 64-bit base register, the one or more diffuser instructions occur before the load instruction in the same code bundles as the load instruction; and
- verifying that no instruction that could modify the base register occurs after any of the one or more diffuser instructions and before the load instruction; and the one or more diffuser instructions include a first instruction that clears one or more most significant bits of the base register, such that a source address of the load instruction must lie within the read area or one of the read area buffer zones.

33. The non-transitory computer storage medium of claim 31, wherein the operations further comprise verifying that each memory page of the read area buffer zones is unmapped or marked as non-readable.

34. A non-transitory computer storage medium encoded with a computer program, the program comprising instructions that when executed by data processing apparatus cause the data processing apparatus to perform operations comprising:

receiving a native code module for an ARM 64-bit instruction set, wherein the instruction set comprises one or more types of forbidden instructions;

loading the native code module into a secure runtime environment, wherein an address space of the secure runtime environment is divided into at least a code area and a non-overlapping trusted area;

validating the native code module, comprising:
- verifying that the code area includes no forbidden instructions; and
- verifying that instructions can be executed only from the code area or the trusted area.

35. The non-transitory computer storage medium of claim 34, wherein verifying that instructions can be executed only from the code area or the trusted area comprises:

verifying that all of the address space other than the code area and the trusted area is marked as non-executable or is unmapped.

36. The non-transitory computer storage medium of claim 34, wherein verifying that instructions can be executed only from the code area or the trusted area comprises:

verifying that branch instructions can only branch to the code area or the trusted area.

37. The non-transitory computer storage medium of claim 36, wherein verifying that instructions can be executed only from the code area or the trusted area further comprises:

partitioning the code area into equally sized code bundles, wherein each code bundle has a start address;

verifying that branch instructions that branch into the code area must branch to the start of one of the equally sized code bundles; and verifying that each branch instruction that branches into the trusted area must branch to a respective safe entry point.

38. A non-transitory computer storage medium encoded with a computer program, the program comprising instructions that when executed by data processing apparatus cause the data processing apparatus to perform operations comprising:

receiving a native code module for an ARM 64-bit instruction set, wherein the native code module comprises one or more indirect branch instructions, each indirect branch instruction having a respective destination address contained in a respective 64-bit destination register;

loading the native code module into a secure runtime environment, wherein an address space of the secure runtime environment is divided into a plurality of regions, and wherein one of the regions is a code area;

partitioning the code area into equally sized code bundles, each code bundle having a respective start address, wherein each start address is a multiple of a predetermined power of two; and validating the native code module, comprising:
- verifying that, for each indirect branch instruction in the native code module, one or more corresponding diffuser instructions exist, wherein the combined effect of the one or more diffuser instructions is to clear one or more of the most significant bits of the destination register such that the destination address must lie within the code area and to clear such that the destination address must be a multiple of the predetermined power of two.

39. The non-transitory computer storage medium of claim 38, wherein validating the native code module further comprises, for each indirect branch instruction in the native code module:

verifying that the one or more corresponding diffuser instructions occur before and in the same bundle as the indirect branch instruction; and verifying that no instruction that could modify the destination register occurs between the one or more corresponding diffuser instructions and the indirect branch instruction.

40. The non-transitory computer storage medium of claim 38, wherein the one or more corresponding diffuser instructions include a first diffuser instruction that clears one or more most significant bits of the destination register, such that the destination address must lie within the code area, and a second diffuser instruction that clears one or more least significant bits of the destination register such that the destination address must be a multiple of the predetermined power of two.

* * * * *